May 2, 1961 S. H. SVENSSON 2,982,168
REFRACTOMETERS FOR LIQUIDS AND GASES
Filed April 6, 1954
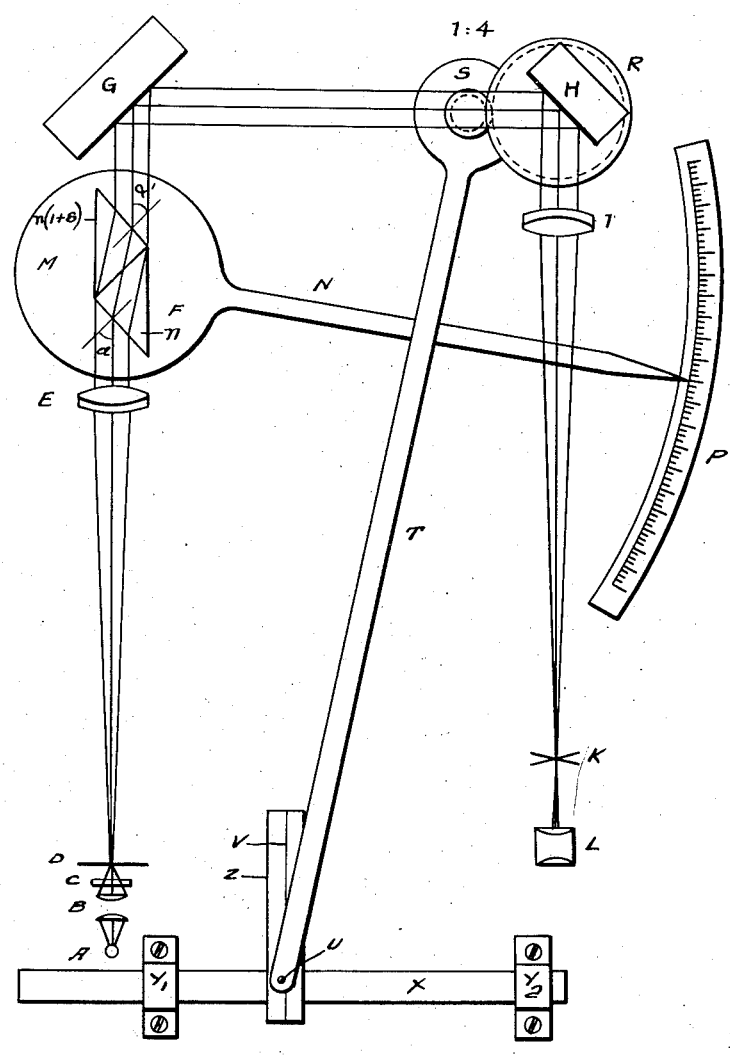
INVENTOR
Svante Harry Svensson
BY Pierce, Scheffler & Parker
ATTORNEY

… … …

United States Patent Office 2,982,168
Patented May 2, 1961

2,982,168
REFRACTOMETERS FOR LIQUIDS AND GASES

Svante Harry Svensson, Sundbyberg, Sweden, assignor to LKB-Produkter Fabriksaktiebolag, Mariehall, Sweden, a Swedish company Filed Apr. 6, 1954, Ser. No. 421,252

Claims priority, application Sweden Apr. 18, 1953

3 Claims. (Cl. 88—14)

Commercially available refractometers for liquids are based on the phenomenon of total reflection or on the measurement of the angular deflection of a light pencil that passes through a hollow prism filled with the liquid in question. A special form of refractometers is that which makes use of a so-called differential prism, i.e. a rectangular prism with a diagonal partition wall. If the liquid to be measured and a reference liquid of neighboring refractive index are filled into the two chambers, small differences in refractivity can be measured very accurately.

All these instruments are characterized in that their sensitivity is fixed by the construction of the instrument and consequently cannot be varied and adapted to different conditions. Another draw-back is that the dependence between refractivity and the reading of the angle is expressed by rather complicated trigonometric equations and that one has a linear dependence only in exceptional cases within very narrow refractivity intervals. The present invention offers two advantages, viz. a continuously variable sensitivity and the ability to extend the range of linear response to a considerable refractivity interval.

The invention is characterized by a special cell associated with elements found in all refractometers, such as collimator and receiving device for reading of angles. The construction of the cell is evident from the accompanying drawing in which the single figure is a plan view of the refractometer. It consists of at least one compartment, viz. for the liquid to be measured, and this borders along a plane partition wall on a reference medium and along another wall perpendicular thereto on an outer medium, e.g. the air or the medium in a thermostat. The reference medium generally is a liquid, but can of course also be solid glass. The reference medium has also an outer wall which is perpendicular to the partition wall and consequently parallel with the above-mentioned outer wall of the object medium. On using the cell in a refractometer it is placed in such a way that the light from the collimator enters one of these mutually parallel outer walls and leaves the cell through the other, whereby the light passes first through one medium, then through the partition wall and then through the other medium.

This cell is in itself not novel. It was used already in the year 1893 by Hallwachs (Ann. Phys. Chem., N.F., 50, 577). The novelty of this invention consists partly in the cell being placed on a table which is made to turn round an axis parallel with the planes of the above-mentioned three walls and perpendicular to the optic axis, whereby a continuously variable entrance angle for the light is obtained, and thereby a continuously variable sensitivity of the cell, partly in that preferentially an entrance angle $\alpha$ is used which satisfies the equation: $\tan 2\alpha \sin 2\alpha = 4n^2$, where $n$ is the refractivity of the medium which the light first passes in the cell (suitably the reference medium), and thereby an unusually great range of linear response is realized. In a special variant of the invention, moreover, the receiving arrangement is constructed so as to permit direct reading of the sine of the double angular deflection instead of the deflection itself, whereby a still greater range of linear response results. Hallwachs used the cell for the entrance angle $\alpha = 0$ only, and as far as known to the inventor, neither he, nor anybody else has investigated the valuable refractive properties of this cell at other entrance angles. The continuously variable sensitivity has not been made use of in any instrument, and still less the optimum entrance angle that was defined above with the aid of a trigonometric equation.

With the notation given on the drawing, the following equation can be derived for the connection between the entrance angle $\alpha$ and the exit angle $\alpha'$:

$$\cos 2\alpha' = \cos 2\alpha - 2n^2\delta(2+\delta) \qquad (1)$$

By the aid of this equation, the angular deflection $\alpha' - \alpha$ can be developed into a power series in $\delta$, the first two terms in this series being:

$$\alpha' - \alpha = \frac{2n^2}{\sin 2\alpha}\delta + \frac{n}{\sin 2\alpha}\left(1 - \frac{4n^2}{\tan 2\alpha \sin 2\alpha}\right)\delta^2 \qquad (2)$$

In the foregoing and also in the following equations the Greek letter $\delta$ represents the relative difference in refractive index between the two media in the cell. One has a linear dependence between the refractivity difference, $n\delta$, and the angular deflection as long as the quadratic term in this equation is negligibly small. The greatest possible range of linear response consequently prevails for such an entrance angle which makes the quadratic term $=0$, i.e. for an angle that satisfies the equation:

$$\tan 2\alpha_0 \sin 2\alpha_0 = 4n^2 \qquad (3)$$

With water as the reference medium, this angle is close to 41°.

If, now, even the third-degree term is deduced for this particular entrance angle, one obtains:

$$\alpha' - \alpha_0 = \frac{2n^2\delta}{\sin 2\alpha_0}\left(1 + \frac{8n^4\delta^2}{3\sin^2 2\alpha_0}\right) \qquad (4)$$

With the aid of this equation, it can be shown that a deviation from linear dependence cannot be revealed by the instrument as long as the refractivity difference satisfies the inequality:

$$(n\delta)^3 \leqq \frac{3}{8n^2R} \qquad (5)$$

where $R$ is the optical resolving power, i.e. the reciprocal of the least refractivity difference that the instrument is able of detecting. With $R = 10^5$ and $n = 4/3$, the condition $n\delta \leqq 0.0128$ is obtained, which is a much higher value than the corresponding value of a differential-prismatic cell of the same sensitivity.

If one now switches from the angular deflection $\alpha' - \alpha$ to the sine of this angle doubled, $\sin 2(\alpha' - \alpha)$, the third-degree term in Equation 4 disappears, and one consequently gets a still greater range of linear response. To get knowledge of how great this is, one has to deduce the fourth-degree approximation of the sine function, and this is:

$$\sin 2(\alpha' - \alpha_0) = \frac{2n^2\delta}{\sin 2\alpha_0} - \frac{2n^4\delta^4}{\sin 4\alpha_0} \qquad (6)$$

From this equation, the following range of linear response is derived:

$$(n\delta)^4 \leqq 1/2R \qquad (7)$$

which, with $R = 10^5$, gives $n\delta = 0.0473$. Since the linear dependence prevails within a range of that magnitude on both sides of the refractivity of the reference medium, one consequently has linear dependence within a refractivity range of 0.0946.

A complete refractometer according to the invention is shown in the drawing. The light from the source A is focused by the condensing lens system B on to the slit D after filtering in the light filter C. The slit is situated in the focal plane of the lens E, and the parallel light therefrom strikes the cell F. The possibly deflected light then strikes the fixed mirror G, which is positioned at an angle of 45° to the light beam and reflects it against the rotatable mirror H. At the measurement, this is turned so as to always make the light parallel with the axis of the lens I, which is indicated by the coincidence between the image of the slit D and the hair-cross K, which is observed through the ocular L.

The variable entrance angle against the cell is obtained by having the latter placed on a table M which is made to turn round an axis perpendicular to the plane of the paper by the aid of the arm N. The entrance angle of the light can be directly read on the circular scale P, which can also, however, be made to show directly the sensitivity of the cell.

The arrangement illustrated also permits direct reading of the sine of the double angular deflection. The mirror H is rigidly connected to the table R, which by gearing exchange in the ratio 1:4 can be turned by moving the arm T, rigidly connected to the cog wheel S. In the other end of the arm, there is a tip U which glides in a groove V of the metal block Z. This in turn is rigidly connected to the rod X guided at $Y_1$ and $Y_2$ in such a way as to make the groove V perpendicular to the direction of motion of the rod X. The linear displacement of the rod X is read with the aid of some sensitive device for measuring length, not shown in the figure.

The mirror H has to be turned through the half angular deflection in order to bring the slit image back to the hair cross. Due to the gear exchange in the ratio 1:4 between the wheels R and S, the latter wheel, and consequently also the arm T, have to be turned through the double angular deflection. Since the tip U glides in the groove V, however, it is the sine of this angle that is read on the scale for the displacement of the rod X.

The apparatus illustrated in the drawing is naturally only an example of how the principles of the invention can be realized in practice, and it is not the purpose to restrict the invention to this example. If one instead makes the whole unit IKL to turn, the gear exchange ratio between this unit and the sine-recording unit shall naturally be a 1:2 instead of 1:4.

I claim:

1. A refractometer having a continuously variable sensitivity comprising collimating means for producing a beam of parallel light, a sample cell having plane, mutually parallel spaced apart entrance and exit surfaces and being divided between said surfaces into two spaces by a plane partition surface perpendicular to said entrance and exit surfaces, one of said spaces containing the medium to be measured, the other space containing a reference medium of known refractivity, means for effecting a controlled turning of the sample cell relative to the entering light beam, means for indicating the entrance angle of the light beam against the entrance surface, and means for indicating the light-deflection in the sample cell, said means for indicating the light-deflection in the sample cell comprising a mirror arranged to reflect the light beam after having been deflected in the sample cell, means for turning said mirror, means for receiving the light beam reflected from the mirror and means for indicating the turning angle of the mirror.

2. A refractometer as claimed in claim 1, in which the means for indicating the turning angle of the mirror is arranged to indicate the sine of one fourth of said turning angle.

3. A refractometer as claimed in claim 2, in which the means for indicating the sine of one fourth of the turning angle of the mirror comprises an arm having one end connected to the means for turning the mirror through a gear exchange with the ratio 1 to 4, the other end of which is slidably supported in a rectilinear groove in a member arranged for a linear displacement in a direction perpendicular to said groove.

References Cited in the file of this patent

UNITED STATES PATENTS 2,580,498      Ackerlind _____ Jan. 1, 1952

FOREIGN PATENTS 97,515      Germany _____ June 8, 1898
819,732      Germany _____ Nov. 5, 1951